(12) United States Patent
Ohlerich et al.

(10) Patent No.: US 10,519,936 B2
(45) Date of Patent: Dec. 31, 2019

(54) LIGHTNING RECEPTOR FOR A WIND TURBINE ROTOR BLADE

(71) Applicant: Nordex Energy GmbH, Hamburg (DE)

(72) Inventors: Nick Ohlerich, Rostock (DE); Jochen Kremer, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 237 days.

(21) Appl. No.: 15/594,204

(22) Filed: May 12, 2017

(65) Prior Publication Data

US 2017/0335830 A1    Nov. 23, 2017

(30) Foreign Application Priority Data

May 18, 2016    (EP) .................................... 16170064

(51) Int. Cl.
 *F03D 80/30* (2016.01)
(52) U.S. Cl.
 CPC .................................... *F03D 80/30* (2016.05)
(58) Field of Classification Search
 CPC combination set(s) only.
 See application file for complete search history.

(56) References Cited

U.S. PATENT DOCUMENTS

| 8,105,035 | B2 | 1/2012 | Bertelsen |
| 8,342,805 | B2 | 1/2013 | Mendez Hernandez et al. |
| 8,888,454 | B2 | 11/2014 | Hansen |
| 9,041,410 | B2 | 5/2015 | Hansen |
| 9,169,826 | B2 | 10/2015 | Muto |
| 2016/0090963 | A1 | 3/2016 | Hoffmann et al. |
| 2016/0222945 | A1* | 8/2016 | Shiraishi ................ F03D 80/30 |

FOREIGN PATENT DOCUMENTS

| DE | 102005051537 A1 | 5/2007 |
| DE | 102015200370 A1 | 7/2015 |
| EP | 1668246 B1 | 6/2006 |
| EP | 2712472 B1 | 4/2014 |
| KR | 20100115139 A | 10/2010 |
| WO | 2013007267 A1 | 1/2013 |

\* cited by examiner

*Primary Examiner* — Ninh H. Nguyen
*Assistant Examiner* — Maxime M Adjagbe
(74) *Attorney, Agent, or Firm* — Walter Ottesen, P.A.

(57) ABSTRACT

Lightning receptor for a wind turbine rotor blade, the lightning receptor being produced in one part in a casting process and having a receptor tip, a receptor suction side, a receptor pressure side, a receptor nose edge and a receptor end edge, defined by a fastening portion with two mutually opposite adhesive bonding surfaces which are formed by recesses in the receptor pressure side and in the receptor suction side, a receptor-nose-edge-side leg and a receptor-end-edge-side leg projecting beyond the fastening portion in a direction away from the receptor tip.

12 Claims, 1 Drawing Sheet

LIGHTNING RECEPTOR FOR A WIND TURBINE ROTOR BLADE

CROSS REFERENCE TO RELATED APPLICATION

Figure 1:
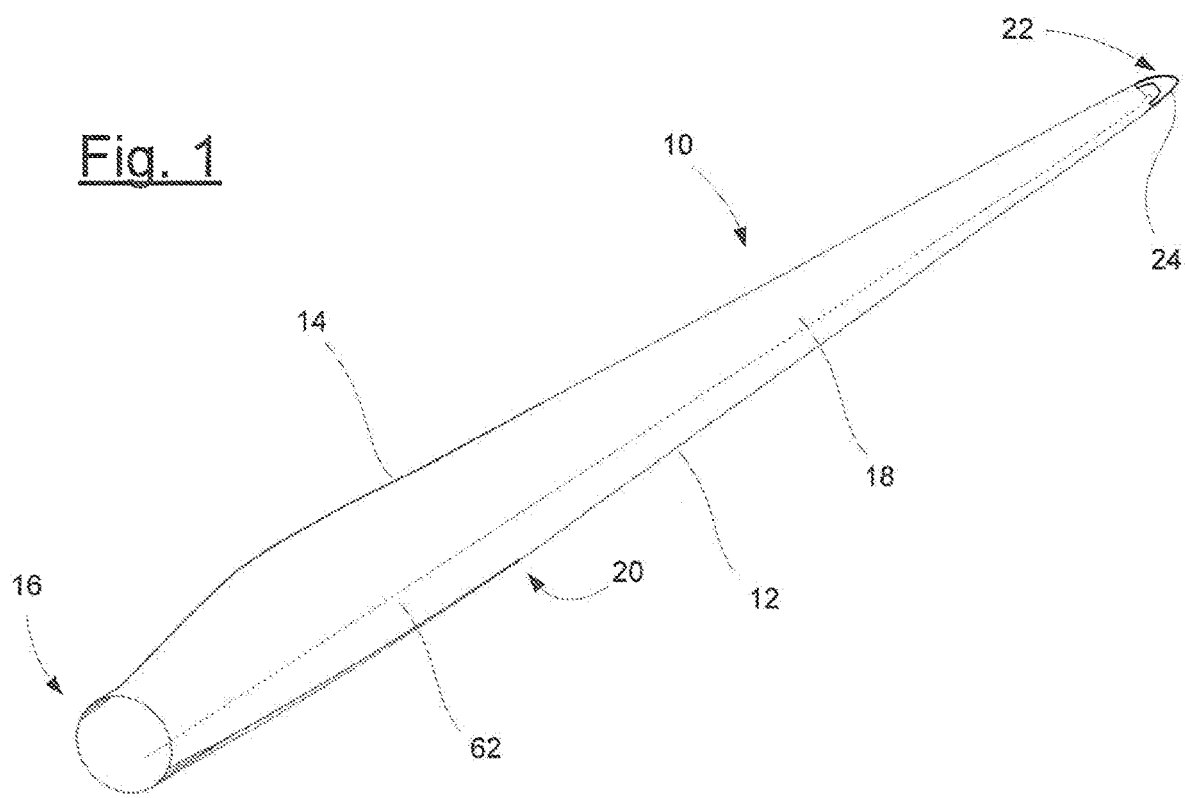

This application claims priority of European patent application No. 16 170 064.6, filed May 18, 2016, the entire content of which is incorporated herein by reference.

FIELD OF THE INVENTION

The invention relates to a lightning receptor for a wind turbine rotor blade, wherein the lightning receptor is produced in one part in a casting process.

BACKGROUND OF THE INVENTION

Owing to their large overall height, wind turbines are affected particularly frequently by a lightning strike. Most frequently, the lightning strikes in the region of the tip of a rotor blade pointing straight up. In order to prevent damage to or even destruction of the rotor blade by the lightning strike, it is known to arrange a lightning receptor in the region of the rotor blade tip and to connect it to a lightning conductor. The current from a lightning flash striking the lightning receptor is then discharged via the lightning conductor to the rotor blade root, from there into the hub, via the nacelle and the tower of the wind turbine to ground.

In practice, however, damage occurs again and again to the rotor blades through lightning strikes. For example, electromagnetic induction can result in arcing occurring between different, electrically conductive structures of a rotor blade. It has also been observed that a lightning flash does not strike directly into a lightning receptor provided therefor but at the edge of the lightning receptor or at a distance therefrom and from there finds another way to the lightning conductor or some other conductive structure. Here, for example, fiber-reinforced plastic materials of the rotor blade can be affected, leading to irreparable damage to the rotor blade.

Document WO 2013/007267 A1 discloses a wind turbine rotor blade having a metallic lightning receptor on the blade tip. In addition, copper meshes or foils are to be mounted on a surface of the rotor blade.

Document DE 10 2005 051 537 A1 discloses a method for retrofitting a lightning protection system in a rotor blade. For this purpose, a rotor blade tip is to be cut off and replaced by a metallic lightning receptor. In some embodiments, the lightning receptor has extensions on the profile nose edge or on the profile end edge that are to be connected to lightning conductors arranged on the outside of the wind turbine rotor blade.

Document EP 2 712 472 B2 discloses a wind turbine rotor blade having a lightning protection device. The latter has a multi-part lightning receptor which is combined with metal foils or meshes.

Document EP 1 668 246 B1 discloses a lightning receptor of multi-part configuration for a wind turbine rotor blade. The lightning receptor is mounted with the aid of a plurality of rods made of a plastic material.

Document WO 2010/100283 A1 discloses a wind turbine rotor blade having a blade tip formed by a plastic part into which a lightning receptor and a lightning conductor are incorporated. Additional electrically conductive layers are arranged on the outside of the rotor blade and isolated from the lightning conductor.

Document EP 2 267 280 A2 discloses arranging a flat layer of a conductive or semi-conducting material on the tip of a wind turbine rotor blade, which material is to exert a field-homogenizing effect in the event of a lightning strike.

Document EP 2 532 893 A1 discloses a lightning receptor for a wind turbine rotor blade, which lightning receptor is made of metal and forms a blade tip of the rotor blade. The lightning receptor has a fastening portion which faces away from the blade tip and which is fastened in the rotor blade. A ceramic component is inserted between the rotor blade and the lightning receptor and surrounds a part of the fastening portion and, owing to its heat resistance, is to avoid damage to the rotor blade when lightning strikes the lightning receptor.

Document DE 10 2015 200 370 A1 discloses a wind turbine rotor blade the tip of which is formed from a metallic lightning receptor. In one embodiment, the lightning receptor has an extension extending along a profile end edge of the rotor blade.

SUMMARY OF THE INVENTION

It is an object of the invention to provide a lightning receptor for a wind turbine rotor blade that effectively prevents damage to the rotor blade during lightning strikes and is simple to manufacture and to mount and, where appropriate, to replace.

This object can, for example, be achieved by a lightning receptor intended for a wind turbine rotor blade, wherein the lightning receptor is produced in one part in a casting process and has a receptor tip, a receptor suction side, a receptor pressure side, a receptor nose edge and a receptor end edge and also a fastening portion with two mutually opposite adhesive bonding surfaces which are formed by recesses in the receptor pressure side and in the receptor suction side, a receptor-nose-edge-side leg and a receptor-end-edge-side leg projecting beyond the fastening portion in a direction away from the receptor tip.

The fastening portion is situated at a distance from the receptor tip and serves for fastening the lightning receptor to the wind turbine rotor blade. When the lightning receptor is mounted on a wind turbine rotor blade as intended, the lightning receptor is arranged on the blade tip of the rotor blade. The receptor tip forms the blade tip of the rotor blade. The receptor suction side forms a portion of the suction side of the rotor blade, the receptor pressure side forms a portion of the pressure side of the rotor blade, the receptor nose edge forms a portion of the nose edge of the rotor blade, and the receptor end edge forms a portion of the end edge of the rotor blade. A receptor-nose-edge-side leg and a receptor-end-edge-side leg delimit the fastening portion and project beyond the fastening portion in a direction away from the receptor tip, that is, with the lightning receptor mounted on the rotor blade, they extend at most, to the blade root of the rotor blade. The fastening portion terminates at a relatively large distance from the blade root. After mounting in the rotor blade, the receptor-nose-edge-side leg and the receptor-end-edge-side leg are not covered by the laminate.

The lightning receptor can be produced simply and cost-effectively in a casting process, for example from aluminum, copper, some other metal or an alloy. The shaping of the lightning receptor can be simply and exactly predetermined in this production process, including the receptor end edge and nose edge. Optimum electrical conductivity is automatically ensured, even in the transition region between receptor end edge or receptor nose edge and receptor tip and to the fastening portion to which a lightning conductor can preferably be fastened.

The invention is based on the finding, which has been corroborated by high-voltage experiments, that the exact location of a lightning strike is barely predictable under realistic operating conditions. The influences of moisture and precipitation and also air flows and air turbulence are too undefined. However, it has been shown that the so-called polarity effect is of importance. This occurs during the comparatively rare, but particularly energy-rich positive lightning strikes in which a space-charge cloud surrounding the rotor blade is positively charged and the rotor blade is negatively charged. In this case, free charge carriers are present in the surroundings of the negatively charged blade tip as a result of ionization. The negatively charged electrons have a relatively high mobility and move relatively quickly away from the blade tip if they are attracted by surrounding, positively charged surfaces/regions. The less mobile, positively charged ions remain back and are attracted by the negatively charged blade tip. The resulting positive space-charge zone around the negatively charged blade tip brings about a shielding of the blade tip, as a result of which lightning strikes are more probable away from the blade tip. In conjunction with the particularly high energies of the positive lightning strikes, this effect increasingly causes serious damage.

Such damage is counteracted in the case of the invention by virtue of the fact that a receptor-nose-edge-side leg and a receptor-end-edge-side leg shield the fastening portion of the lightning receptor that is arranged in the interior of the rotor blade. The striking of positive lightning flashes into the fastening portion is avoided since, even with the receptor tip shielded by the space-charge effect explained, a lightning strike into the receptor nose edge or receptor end edge is more probable.

A further advantage of a lightning receptor according to the invention is the simple and secure fastening to the wind turbine rotor blade with the aid of the two mutually opposite adhesive bonding surfaces. These are formed by recesses in the receptor pressure side and the receptor suction side. Engaging in these recesses are complementarily formed fastening portions of the wind turbine rotor blade which, where appropriate only upon mounting of the lightning receptor, are formed in a laminating process by a fiber-reinforced plastic material. In this way, a secure hold is achieved by adhesive bonding surfaces the formation of which does not require any particular lightning-strike-endangered edges in the surroundings of the adhesive bonding surfaces. Should at some point a replacement of the lightning receptor be required, the laminate portions can be simply removed and built on anew.

With the lightning receptor properly mounted on the wind turbine rotor blade, the recesses are filled with a material of the rotor blade after the gluing of the adhesive bonding surfaces, with the result that the portions of the pressure or suction side of the rotor blade that are formed by the receptor pressure side and receptor suction side adjoin, in a substantially transition-free manner, the pressure and suction side portions formed by the material of the rotor blade.

In one embodiment, the adhesive bonding surfaces are arranged in an inwardly offset manner relative to the receptor pressure side or relative to the receptor suction side. In particular, they are situated at a uniform distance from an imaginary continuation of the receptor pressure side and receptor suction side or, with the lightning receptor properly mounted on a wind turbine rotor blade, at a uniform distance from the pressure or suction side of the rotor blade.

In one embodiment, the recesses are rectangular or trapezoidal. This statement relates in particular to a view in the direction of the receptor pressure side or the receptor suction side. In particular, a trapezoidal configuration of the recesses allows secure fastening, with more or less uniformly wide portions of the receptor pressure side and receptor suction side remaining in the longitudinal direction of the lightning receptor. Independently thereof, the recesses can also be rectangular or trapezoidal in cross section.

In one embodiment, the recesses have a uniform depth in the range from 1 mm to 10 mm. They can thus be filled with a fiber composite material which consists of one or more layers of a fiber material and a plastic matrix.

In one embodiment, at least one bore is arranged in an adhesive bonding surface. This can be a blind bore or a through-bore which passes through from the recess in the receptor pressure side to the recess in the receptor suction side. Secure adhesive bonding is promoted by the provision of such bores.

In one embodiment, the fastening portion has connection means for a lightning conductor. This can, for example, be a threaded bore into which a fastener for the lightning conductor is screwed, or a receptacle for the lightning conductor itself or a fastening portion thereof.

In one embodiment, the connection means are arranged on an end face of the fastening portion that is arranged closer to the receptor tip than an end of the fastening portion that is remote from the receptor tip. The end face can be oriented substantially perpendicularly to the receptor suction side and pressure side. In the stated arrangement of the connection means, particularly effective shielding also of the connection region of the lightning conductor is achieved by the receptor-end-edge-side and receptor-nose-edge-side legs of the receptor tip. Consequently, it is possible to fasten the lightning conductor to the receptor tip via a force-locking connection (screw connection). In the case of conventional receptor tips, the lightning conductor is connected to the receptor tip by an integrally bonded connection, since the tip can be produced free of edges. A screw connection is more advantageous in view of repairs on the lightning protection system. However, this type of connection is much more attractive for lightning flashes on account of the edges present and would have to be enclosed by a corresponding isolation layer. In accordance with the present invention, the use of a screw connection is possible without problems since the connection point is shielded from lightning strikes by the receptor-end-edge-side leg and receptor-nose-edge-side leg of the receptor tip.

In one embodiment, the end face has a concave curvature. By virtue of this measure, the connection region for the lightning conductor is particularly effectively integrated into the shielded region of the fastening portion. Particularly if a relatively large radius of curvature is chosen, for example in the range from 5 cm to 20 cm, the formation of edges attractive for a lightning strike is avoided.

In one embodiment, the lightning receptor is combined with a wind turbine rotor blade to which it is properly fastened in the manner already explained, with the result that the receptor tip forms a blade tip, the receptor suction side forms a portion of a suction side, the receptor pressure side forms a portion of a pressure side, the receptor nose edge forms a portion of a profile nose edge, and the receptor end edge forms a portion of a profile end edge of the wind turbine rotor blade. The wind turbine rotor blade can furthermore have a lightning conductor which is arranged in particular in the interior of the rotor blade. The lightning conductor is connected to the lightning receptor, in particular with the aid of the explained connection means on the fastening portion.

BRIEF DESCRIPTION OP THE DRAWINGS

Figure 2:
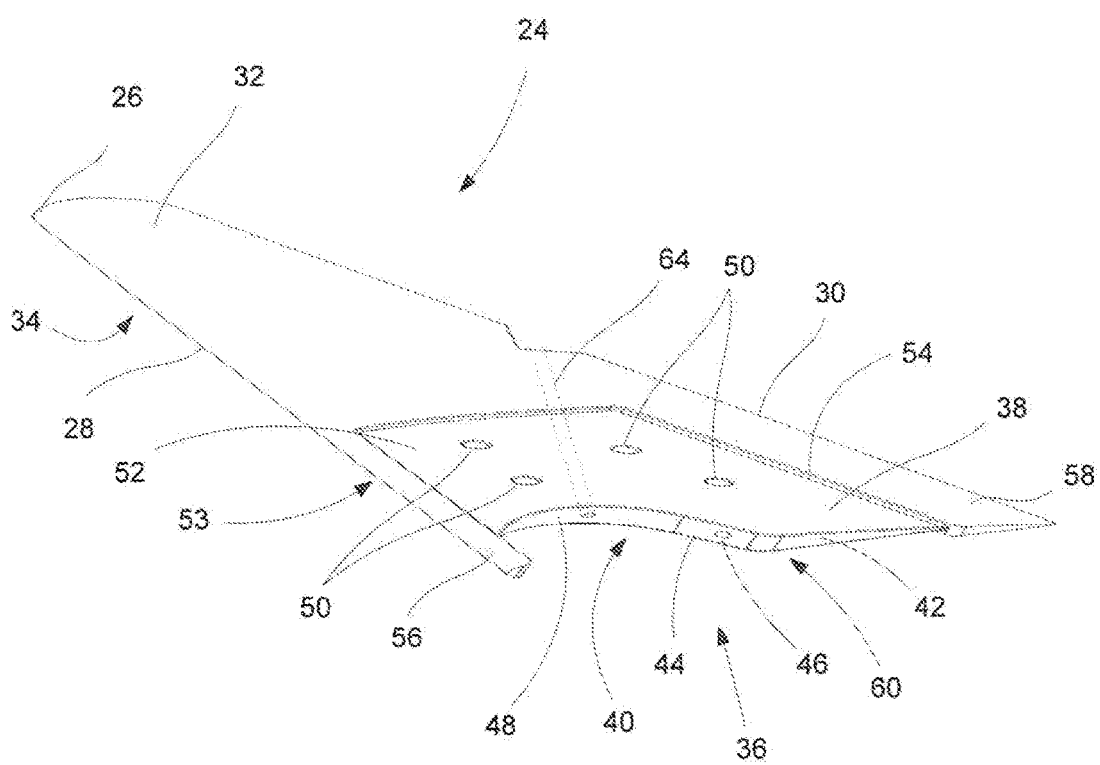

The invention will now be described with reference to the drawings wherein:

FIG. 1 shows a wind turbine rotor blade having a lightning receptor according to the invention in a simplified respective illustration, and FIG. 2 shows a lightning receptor according to the invention in a perspective view.

DESCRIPTION OF THE PREFERRED EMBODIMENTS OF THE INVENTION

The wind turbine rotor blade 10 of FIG. 1 has a profile nose edge 12, a profile end edge 14, a blade root 16, a suction side 18 and a pressure side 20. The blade tip 22 is formed by a lightning receptor 24 to which there is connected a lightning conductor 62 extending in the interior of the wind turbine rotor blade 10 as far as the blade root 16.

Details of the lightning receptor 24 can be seen more clearly in FIG. 2. The lightning receptor 24 shown there is produced in one part in a casting process, in the example from aluminum. It has a receptor tip 26, a receptor nose edge 28, a receptor end edge 30, a receptor suction side 32 and a receptor pressure side 34, which faces away from the observer in FIG. 2. It can be seen that the lightning receptor 24 has an aerodynamic profile in cross section.

At the end facing the observer and remote from the receptor tip 26, the lightning receptor 24 has a fastening portion 36 which has two mutually opposite adhesive bonding surfaces 38, 40. The adhesive bonding surface 38 is formed by a trapezoidal recess in the receptor suction side 32. The adhesive bonding surface 40 facing away from the observer in FIG. 2 is likewise trapezoidal. It is formed by a recess in the receptor pressure side 34.

The fastening portion 36 has, at its end facing away from the receptor tip 26, an end face 60 which is oriented substantially perpendicularly to the receptor suction side 32 and the receptor pressure side 34. A first portion 42 of this end face extends in the direction of the aerodynamic profile. It is adjoined by a second portion 44 which is arranged obliquely with respect to a longitudinal direction of the lightning receptor 24 and in which there is formed a threaded bore 46 for connecting the lightning conductor 62. A threaded bolt, to which the lightning conductor is fastened via a cable shoe and a nut (not shown), can be inserted into the threaded bore. The second portion 44 of the end face 60 is adjoined by a concavely curved, third portion 48 of the end face that runs in an arc to the receptor nose edge 28. In this region is situated the inlet opening of a drainage bore 64 which extends through the receptor tip 26. The inlet opening of the drainage bore is arranged in the portion 48 such that It is situated at the deepest point of the concave curvature if the rotor blade points downward with the blade tip, that is if it is in the so-called 6-o'clock position. It is thereby ensured that condensation present in the rotor blade runs into the drainage bore 64.

The recesses 52, 53 on the receptor pressure side 34 and the receptor suction side 32, the bottom surfaces of which form the adhesive bonding surfaces 38, 40, are trapezoidal and have an edge 54 of a few millimeters in height which runs around three sides of the trapezoid. A correspondingly formed end of the rotor blade 10 is adhesively bonded to the adhesive bonding surfaces 38, 40. Four bores 50 are formed in the adhesive bonding surfaces 38, 40. The bores 50 can be formed as blind bores both on the receptor suction side 32 and on the receptor pressure side 34. Alternatively, they can be configured as through-bores between the receptor suction side 32 and receptor pressure side 34. The bores 50 serve to accommodate excess adhesive when mounting the lightning receptor 24 on the wind turbine rotor blade 10.

The receptor 24 has, at its end facing the observer, a nose-edge-side leg 56 and an end-edge-side leg 58 which are adjacent to the fastening portion 36 and which project beyond the fastening portion 36 in a direction away from the receptor tip 26. After mounting the receptor tip 24 on the rotor blade 10, the two legs 56, 58 are not covered by the laminate of the rotor blade.

It is understood that the foregoing description is that of the preferred embodiments of the invention and that various changes and modifications may be made thereto without departing from the spirit and scope of the invention as defined in the appended claims.

LIST OF REFERENCE SIGNS USED

10 Wind turbine rotor blade
12 Profile nose edge
14 Profile end edge
16 Blade root
18 Suction side
20 Pressure side
22 Blade tip
24 Lightning receptor
26 Receptor tip
28 Receptor nose edge
30 Receptor end edge
32 Receptor suction side
34 Receptor pressure side
36 Fastening portion
38 Adhesive bonding surface
40 Adhesive bonding surface
42 First portion of the end face 60
44 Second portion of the end face 60
46 Threaded bore
48 Third portion of the end face 60
50 Bore
52 Recess
53 Recess
54 Edge
56 Nose-edge-side leg of the receptor 24
58 End-edge-side leg of the receptor 24
60 End face
62 Lightning conductor
64 Drainage bore

What is claimed is:

1. A lightning receptor for a wind turbine rotor blade, the lightning receptor comprising:
a lightning receptor body being a one part body produced in a casting process;
said lightning receptor body having a receptor tip, a receptor suction side, a receptor pressure side, a receptor nose edge, and a receptor end edge;
said lightning receptor body further defining a fastening portion with two mutually opposite adhesive bonding surfaces which are formed by recesses in said receptor pressure side and in said receptor suction side; and, said lightning receptor body having a receptor-nose-edge-side leg and a receptor-end-edge-side leg projecting beyond said fastening portion in a direction away from said receptor tip.

2. The lightning receptor of claim 1, wherein said adhesive bonding surfaces are arranged in an inwardly offset manner relative to said receptor pressure side or relative to the receptor suction side.

3. The lightning receptor of claim 1, wherein said recesses are rectangular or trapezoidal.

4. The lightning receptor of claim 1, wherein said recesses have a uniform depth lying in a range from 1 millimeter to 10 millimeters.

5. The lightning receptor of claim 1, wherein at least one bore is arranged in at least one of said adhesive bonding surfaces.

6. The lightning receptor of claim 1, wherein said fastening portion has a connection arrangement for a lightning conductor.

7. The lightning receptor of claim 6, wherein:
said fastening portion has an end face and an end;
said end is disposed remote from said receptor tip;
said end face is arranged closer to said receptor tip than said end; and,
said connection arrangement is arranged on said end face.

8. The lightning receptor of claim 7, wherein said end face has a concave curvature.

9. A wind turbine rotor blade comprising:
a lightning receptor being a one part body and produced as one part in a casting process;
said lightning receptor having a receptor tip, a receptor suction side, a receptor pressure side, a receptor nose edge, and a receptor end edge;
said lightning receptor further defining a fastening portion with two mutually opposite adhesive bonding surfaces which are formed by recesses in said receptor pressure side and in said receptor suction side;
said lightning receptor having a receptor-nose-edge-side leg and a receptor-end-edge-side leg projecting beyond said fastening portion in a direction away from said receptor tip;
said receptor tip forming a blade tip;
said receptor suction side forming a portion of a suction side;
said receptor pressure side forming a portion of a pressure side;
said receptor nose edge forming a portion of a profile nose edge; and,
said receptor end edge forming a portion of a profile end edge of the wind turbine rotor blade.

10. The lightning receptor of claim 1, wherein said lightning receptor body is made of a metal.

11. The lightning receptor of claim 1, wherein said lightning receptor body is made of at least one of aluminum and copper.

12. The lightning receptor of claim 1, wherein said lightning receptor body is made of an alloy.

* * * * *

UNITED STATES PATENT AND TRADEMARK OFFICE
CERTIFICATE OF CORRECTION

PATENT NO. : 10,519,936 B2
APPLICATION NO. : 15/594204
DATED : December 31, 2019
INVENTOR(S) : N. Ohlerich et al.

Page 1 of 1

It is certified that error appears in the above-identified patent and that said Letters Patent is hereby corrected as shown below:

In the Specification

In Column 2:
Line 55: delete "that, is," and substitute -- that is, -- therefor.
Line 56: delete "at most, to" and substitute -- at most to -- therefor.

In Column 5:
Line 6: delete "BRIEF DESCRIPTION OP THE DRAWINGS" and substitute -- BRIEF DESCRIPTION OF THE DRAWINGS -- therefor.
Line 58: delete "It" and substitute -- it -- therefor.

In Column 6:
Line 14: delete "receptor tip 24" and substitute -- receptor 24 -- therefor.

Signed and Sealed this
Twenty-eighth Day of April, 2020

Andrei Iancu
*Director of the United States Patent and Trademark Office*